United States Patent [19]

Medina

[11] Patent Number: 5,368,487
[45] Date of Patent: Nov. 29, 1994

[54] LAPAROSCOPIC TRAINING DEVICE AND METHOD OF USE

[76] Inventor: Marelyn Medina, 81 Browning Ave., Nashua, N.H. 03062

[21] Appl. No.: 923,221

[22] Filed: Jul. 31, 1992

[51] Int. Cl.$^5$ .............................................. G09B 23/28
[52] U.S. Cl. ...................................................... 434/262
[58] Field of Search ............... 434/262, 267, 272, 273, 434/270, 271; 128/20, 849, 851, 852, 853; 248/311.2, 124.125

[56] References Cited

U.S. PATENT DOCUMENTS

| | | | |
|---|---|---|---|
| 546,081 | 9/1895 | Reyer | 248/124 X |
| 757,933 | 4/1904 | Linendoll | 248/124 X |
| 1,600,599 | 9/1926 | Parker | 434/272 |
| 2,905,418 | 9/1959 | Escartin | 248/125 |
| 3,991,490 | 11/1976 | Markman | 434/272 |
| 4,136,466 | 1/1979 | Wrue | 434/271 |
| 4,386,917 | 6/1983 | Forrest | 434/267 |

FOREIGN PATENT DOCUMENTS 8001728  8/1980  WIPO ................... 434/267

*Primary Examiner*—Gene Mancene
*Assistant Examiner*—Jeffrey A. Smith
*Attorney, Agent, or Firm*—Wolf, Greenfield & Sacks

[57] ABSTRACT

A device for assisting in the training of laparoscopic surgical techniques is disclosed. The device is characterized in that it provides a relatively simple, transportable device that allows a physician to practice laparoscopic surgical techniques without the need for assistance or complicated surgical set-ups.

6 Claims, 8 Drawing Sheets

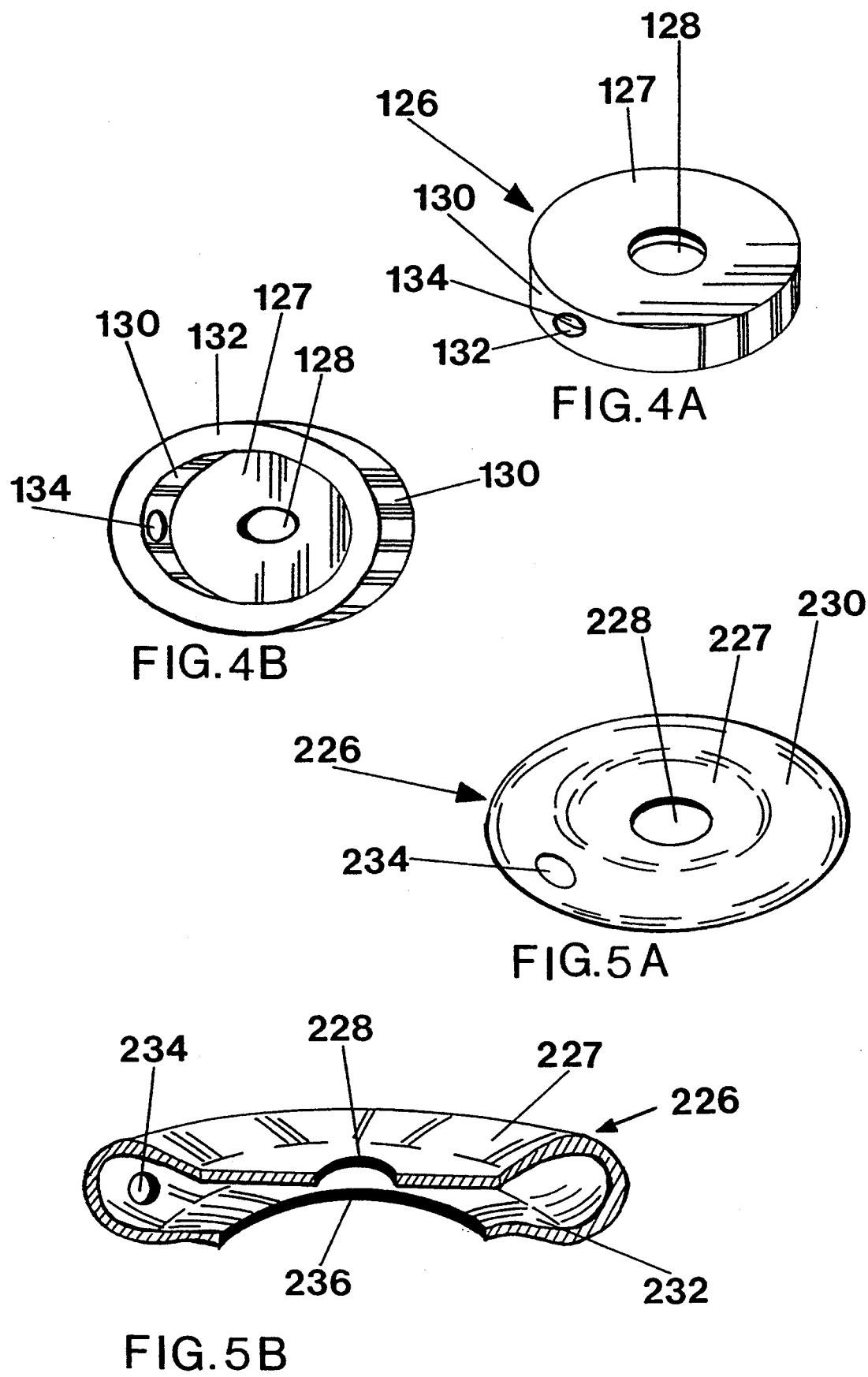

LAPAROSCOPIC TRAINING DEVICE AND METHOD OF USE

FIELD OF THE INVENTION

This invention pertains to a device to assist in the teaching of laparoscopic surgical techniques.

BACKGROUND OF THE INVENTION

In recent years, laparoscopic surgery has been used in increasingly numerous and complex applications. Unfortunately, laparoscopic techniques require the surgeon to obtain a great deal of training and practice prior to performing laparoscopic surgery upon a human patient. At present, surgeons experience significant difficulty during training for laparoscopic techniques. The current method for surgical training often involves the use of pigs with an elaborate operating room set-up requiring considerable personnel. Additionally, the procedure necessitates placing live animals under anesthesia. Typically, two laboratory technicians are needed; one to maintain the animal under proper anesthesia and the other to provide assistance with the surgical equipment. In addition, in a typical laparoscopic training session, at least three surgeons are needed to assist with the equipment and to operate a telescopic video camera that is inserted into the patient.

Unfortunately, such training sessions are expensive and time-consuming while providing only a short period of practice time for each of the surgeons involved. To date, there is no satisfactory means to obtain extensive, non-operative experience in handling laparoscopic instruments and performing surgical techniques such as the dissection of tissue planes, knot tying and suturing without a supply of animals and operating equipment and personnel as described above.

Although laparoscopic training devices do exist, the current simulators are less than satisfactory. Typically, these devices consist of a rigid box having numerous ports to allow observation, passage of instruments and a video telescope. Small pieces or meat or synthetic organ models are placed within these devices and can serve as surgical models upon which the surgeon can practice simple techniques such as knot tying, grasping and cutting. Although such devices eliminated the need to practice laparoscopic techniques in the operating room environment, they tend to be overly cumbersome while providing a less than satisfactory surgical simulation. Additionally, such devices severely limit the size of the surgical field within which the surgeon may practice.

SUMMARY AND OBJECTS OF THE INVENTION

The present invention is configured to permit a solitary surgeon to practice, in a simulated environment, surgical techniques using laparoscopic instruments. The surgeon may then perfect essential surgical maneuvers on natural organ tissue provided by animal cadavers instead of plastic or sponge equivalents.

The present invention provides a fixed area and space that substitutes as a phantom abdominal wall though which laparoscopic instruments can be inserted. In its broadest form, the invention comprises a means for defining an aperture to simulate an abdominal opening through which laparoscopic surgery may be performed.

The present invention, in its simplicity, is designed to allow surgeons to practice essential laparoscopic techniques at a fraction of the cost of current surgical training methods. Furthermore, the device is not intended merely for surgical trainees. Rather, even experienced surgeons working in hospitals with laparoscopic equipment can use the device of the present invention to practice or develop skills without the need of expensive equipment or assistance. Rather, the present invention allows a surgeon to practice laparoscopic surgery in connection with only a model surgical field, a video camera, a video display monitor and standard laparoscopic instruments. Although the invention does not eliminate the need for surgeons to undergo formal training in an accredited teaching center using live animals under anesthesia, the invention serves to complement this training by permitting surgeons to master techniques at their own pace and convenience.

Furthermore, as the present invention does not serve to enclose the model upon which surgery is being performed, the device is well suited for practicing surgical techniques on surgical models of virtually any size and also eliminates the need to use expensive and fragile video telescopes such as those used in actual laparoscopic procedures.

Thus, it is one object of the present invention to provide a device for practicing laparoscopic surgical techniques that eliminates the need to practice such techniques in an operating room.

It is yet another object of the present invention to provide a device for training laparoscopic surgical techniques that eliminates the need for a living, anesthetized surgical subject.

It is still another object of the present invention to provide a device for training laparoscopic techniques that is simple, portable and inexpensive.

It is a further object of the present invention to provide a device for training laparoscopic surgical techniques that allows a surgeon to practice such techniques without the need of assistants.

It is still a further object of the present invention to provide a device for teaching laparoscopic surgical techniques that is adapted to allow the surgery to be practiced upon virtually any size surgical model or specimen.

It is yet another object of the present invention to provide a device for teaching laparoscopic surgical techniques that eliminates the need for a surgical video telescope.

It is yet another object of the present invention to provide a device for teaching laparoscopic techniques that is readily portable, therefore allowing the surgeon to practice such techniques in virtually any location.

These and other objects of the present invention will become apparent from the accompanying description and drawings.

BRIEF DESCRIPTION OF THE DRAWINGS

FIGS. 4A and 4B depict one embodiment of a moveable surface of the present invention.

FIGS. 5A and 5B depict another embodiment of a moveable surface of the present invention.

DETAILED DESCRIPTION OF THE INVENTION

Since the present invention is simple in design, the cost for production and distribution of the device is expected to be minimal. The device allows a solitary surgeon to acquire training at his or her convenience, without the assistance of other surgeons, nurses or technicians. The device allows an open system to perform surgery simulations, therefore allowing an entire small animal to be dissected at any given time. This may be contrasted with the current simulators which provide only a small, confined space within which to work.

Figure 1:
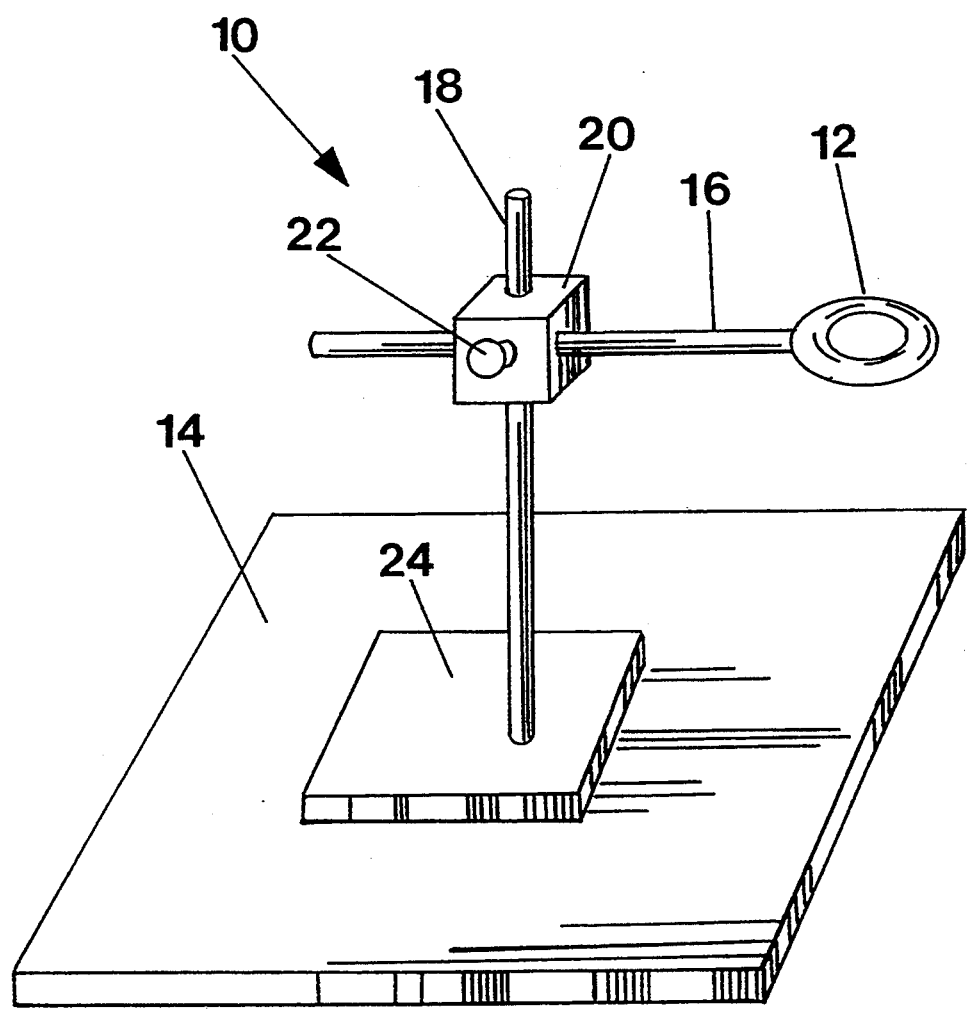
FIG. 1 is schematic drawing of one embodiment of a laparoscopic training device of the present invention.

In its broadest embodiment, the present invention 10 comprises an aperture defining means 12 such as an annular ring that is mounted and positioned at a position above an operating surface 14 that simulates the height above an operating table at which a surgical opening for laparoscopic surgery is typically present. The aperture defining means 12 preferably has attached thereto an extension rod 16 that allows the aperture defining means 12 to be mounted to a suitable support rod 18 as depicted in FIG. 1. The extension rod 16 is mounted to the supporting rod 18 by a standard laboratory coupler 20 that, by means of set-screws 22, allows the aperture defining means 12 to be moved up and down in a vertical plane, horizontally in a circular arc, and inwardly and outwardly in a radial direction. The supporting rod 18 is typically attached to a base 24 which may, in turn, be affixed to the surgical surface 14.

The aperture defining means 12 and the extension rod 16 connected thereto may be in many of wide variety of configurations. For example, either one or both of the aperture defining means and the extension rod may have a circular cross-section or, alternatively, they may have square, rectangular, triangular, or other cross-sections. In addition, the aperture defining means 12, although typically a circular annulus, may, if preferred, define a square, rectangular, triangular or other aperture. In addition, although the coupler 20 depicted in FIG. 1 comprises a generally cube-shaped device having non-intersecting perpendicular holes drilled therethrough for engaging a pair of rods in an orthogonal relationship, any of a wide variety of coupling devices adapted to achieve the same function may be substituted. Furthermore, the supporting rod 18 need not be affixed to a base 24 but rather, if desired, may be attached to a surgical surface 14 by any of a wide variety of well-known temporary or permanent attachment means. For example, if it is desired that the supporting rod be moveable, a standard "C-clamp" or suction device may be used to attach the support to a surface. In addition, if the physician is willing to sacrifice the ability to reposition the aperture defining means 12 in the radial direction, the aperture defining means 12 may include a means for attachment directly to the supporting rod 18 thereby eliminating the extension rod 16.

In a preferred embodiment, the aperture defining means 12 further includes a moveable surface 26 which simulates the movement of a patient's skin about the surgical opening. The moveable surface 26 includes a simulated surgical aperture 28 through which the practicing physician may insert a laparoscopic instrument.

The moveable surface 26 may be formed of any of a wide variety of rigid, semi-rigid, or flexible materials. For example, if rigidity is desired, the surface can be formed of wood, metal, or a stiff polymeric material such as nylon. Alternatively, if a flexible surface, more simulative of human skin is desired, the surface can be fabricated of leather or rubber.

Figure 2:
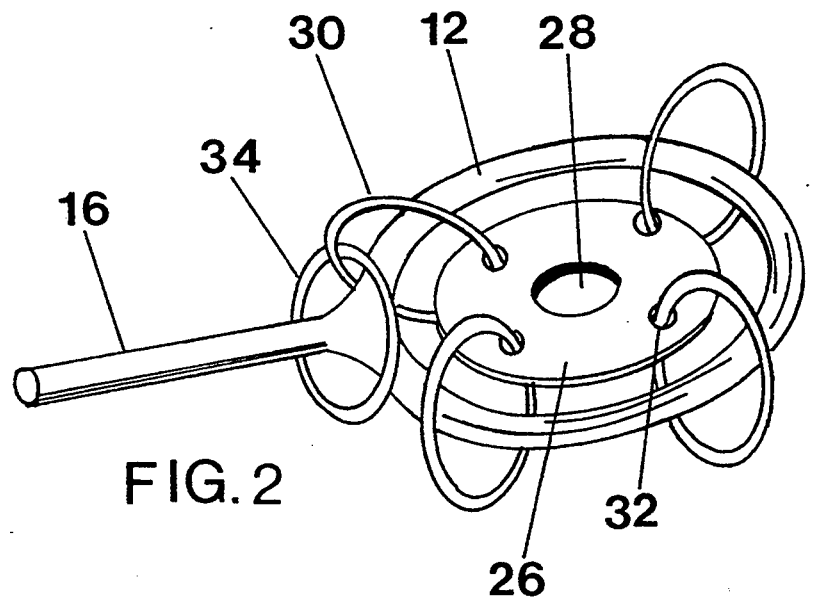
FIG. 2 is one embodiment of a portion of the present invention showing a moveable surface mounted within an aperture defining means by use of rings.

The moveable surface 26 may be mounted to the aperture defining means by any of a wide variety of mounting means. As depicted in FIG. 2, the mounting means can comprise a plurality of rings 30 which encircle a portion of the aperture defining means 12, and pass through mounting apertures 32 formed into the moveable surface. The rings 30 may be made of metal, plastic or any other material capable of supporting the moveable surface 26 within the aperture defining means 12, and they may be either permanently sealed or openable to thereby allow disassembly of the device. In the case in which such rings are used, it is preferred that a rotation suppressing ring 34 be mounted over the extension rod and through one of the rings 30 which supports the moveable surface 26 in order to prevent rotation of the moveable surface 26 during a surgical training session.

Figure 3:
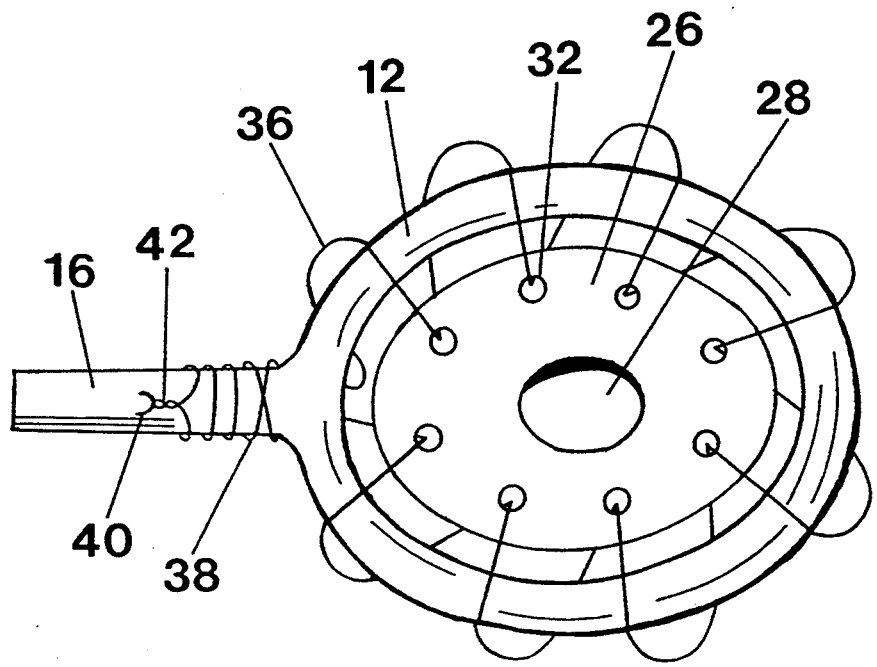
FIG. 3 is another embodiment of a portion of the present device showing a moveable surface mounted within an aperture defining means by use of a wire or thread.

FIG. 3 depicts an alternative embodiment for mounting the moveable surface 26 and its surgical aperture 28 within the aperture defining means 12. In FIG. 3, the moveable surface 26 includes a plurality of mounting apertures 32. An elongated wire or thread 36 is wrapped around the aperture defining means 12 and through the mounting apertures 32 in order to effectively suspend the moveable surface 26 within the aperture defining means 12. The ends 40 of the wire or thread 36 are wrapped 38 about the extension rod 16 adjacent to the point at which it connects to the aperture defining means 12. Subsequently, the ends 40 of the wire or thread are secured using a twist or knot 42, or other like methods.

An alternative moveable surface is present in FIGS. 4A and 4B. Specifically, FIGS. 4A and 4B depict a moveable surface 126 comprising a semi-rigid material, such as rubber, that is adapted to the be fitted over an aperture defining means. The moveable surface 126 comprises an annulus 127 of semi-flexible material having a surgical aperture 128 contained therein. A sidewall 130 extends downwardly from the annulus 127 and includes a flexible lip 132 at its lower surface. The sidewall 130 further includes an extension rod aperture 134 which allows an extension rod connected to an aperture defining means to extend through the moveable surface 126. In use, the moveable surface 126 of FIGS. 4A and 4B is fitted over an aperture defining means in a manner such that the sidewall 130 surrounds the circumference of the aperture defining means and the lip 132 and annulus 127 cover the lower and upper surfaces of the aperture defining means, respectively. Thus, rather than suspending a moveable surface within the aperture of the aperture defining means, the moveable surface 126 of FIGS. 4A and 4B surrounds the aperture defining means and provides an externally mounted region through which a surgeon may practice laparoscopic surgical techniques.

Still another embodiment of such an externally mounted moveable surface is depicted in FIGS. 5A and 5B. In these figures, a flexible membrane, such as the preferred latex membrane is provided about an aperture defining means. In this embodiment, a moveable surface 226 having a flexible annulus 227 defining a surgical aperture 228 can be fitted over an aperture defining means and held in place by sidewalls 230 and a lower lip 232. The moveable surface 226 may be provided with an extension rod aperture 234 to allow an extension rod or other connecting means extending from the aperture defining means to pass through the moveable surface.

In the embodiment of FIGS. 5A and 5B, the moveable surface is preferably formed of a resilient material, such as latex, having a diameter smaller than that of the aperture defining means. Thus, when the device is stretched over an aperture defining means, the resilient nature of the material will tend to securely mount the moveable surface in position. The lower lip 232 serves to define a lower aperture 36 which is the same size or larger in diameter than the surgical aperture 228 and allows the surgeon to manipulate the laparoscopic instruments without interference.

Figure 6:
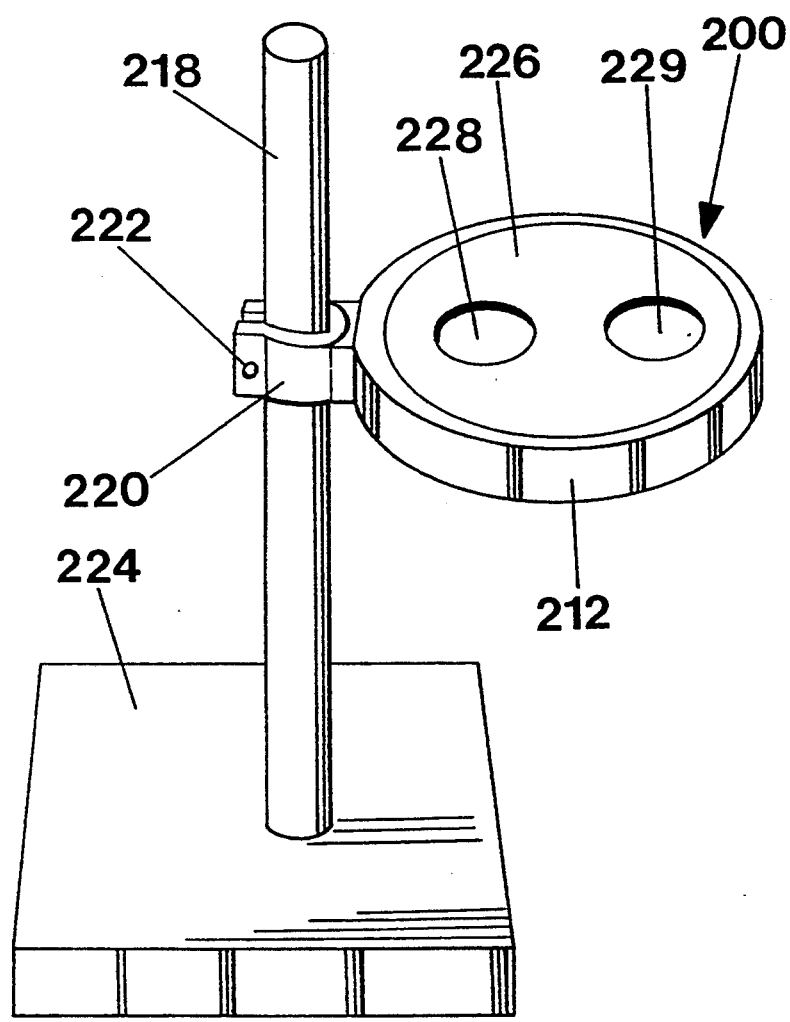
FIG. 6 depicts an embodiment of the present invention having two surgical apertures.

Still another embodiment of the present invention is depicted in FIG. 6. In FIG. 6 the laparoscopic training device 200 comprises an aperture defining means 212 mounted directly to a vertical supporting rod 218 via a rod clamp 220. A set screw 222 or other similar adjusting device contained on the rod clamp 220 allows the aperture defining means 212 to be raised, lowered and rotated within a horizontal plane. The vertical supporting rod 218 may be connected to a base 224 or optionally, provided with a removeable affixing means such as a "C-clamp" or vacuum pump device to allow the vertical supporting rod 218 to be readily moved. Unlike the aperture defining means depicted in the previous embodiments, the aperture defining means 212 as depicted in FIG. 6 defines a generally oblong aperture. In addition, the cross-section of the aperture defining means 212 can be variable in shape from the rectangular shape demonstrated in FIG. 6, to other geometric configurations. Furthermore, unlike the embodiments described previously, in FIG. 6, the moveable surface 226 is not limited to a single surgical aperture. Rather, the moveable surface 226 includes first 228 and second 229 surgical apertures through which laparoscopic instruments may be inserted simultaneously. Such a configuration adds further realism to a training session in that it allows manipulation of a surgical device passing through one of the surgical apertures may transmit movement to a different laparoscopic instrument passing through the other surgical aperture. It should be noted that the device of this embodiment is not intended to be limited solely to devices having two surgical apertures, but rather, may contain any number of apertures as required to simulate laparoscopic surgical conditions.

It should be noted that although preferred, the invention is not intended to be limited to a configuration in which the aperture defining means includes a moveable surface. Rather, if the aperture defining means is constructed to have a central aperture which corresponds generally in size to a surgical aperture (or a simulation thereof) the defined aperture itself may be used as the surgical aperture.

Figure 7:
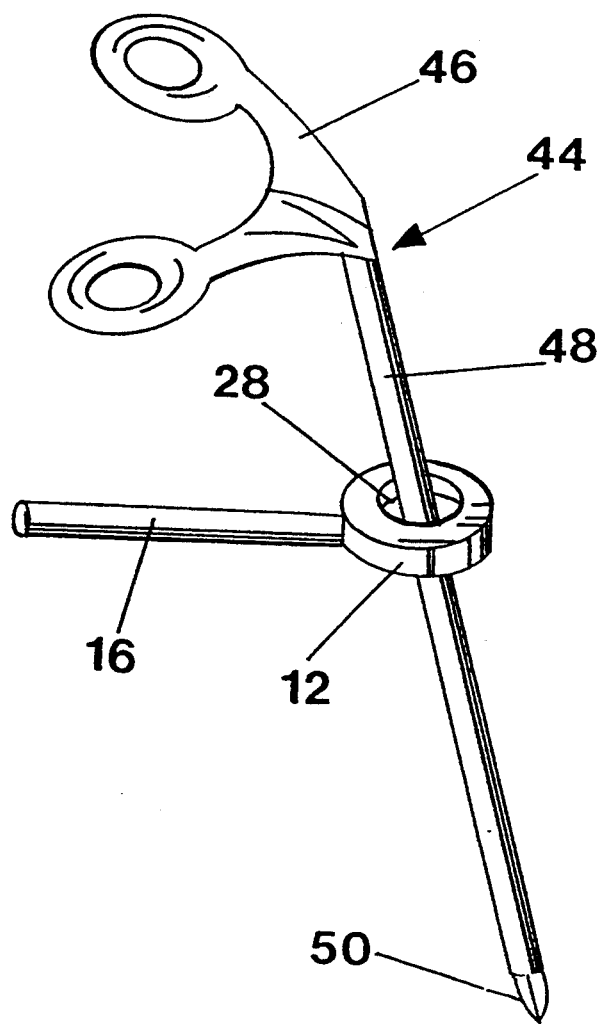
FIG. 7 depicts one embodiment of a portion of the present invention showing its relationship to a laparoscopic instrument during a training procedure.

The use of an aperture defining means having an aperture corresponding in size to that of a surgical aperture is depicted schematically in FIG. 7. In particular, FIG. 7 shows an aperture defining means 12 having an extension rod 16 extending therefrom being maintained in a working relationship with a laparoscopic instrument 44. More specifically, the figure shows a laparoscopic cutter 44 having a handle 46, a shaft 48 and cutter head assembly 50 being passed through the surgical aperture 28 of an aperture defining means 12. The aperture defining means defines an area which simulates a surgical opening in a patient and limits movement of the laparoscopic instrument 44 to that such as may be experienced during an actual laparoscopic surgical procedure.

As an alternative, the surgical aperture of the devices of the present invention may then be fitted first with a trocar through which a laparoscopic instrument may then be inserted. In this manner, the use of laparoscopic instruments through a trocar, as in an actual laparoscopic procedure, may be simulated.

Figure 8:
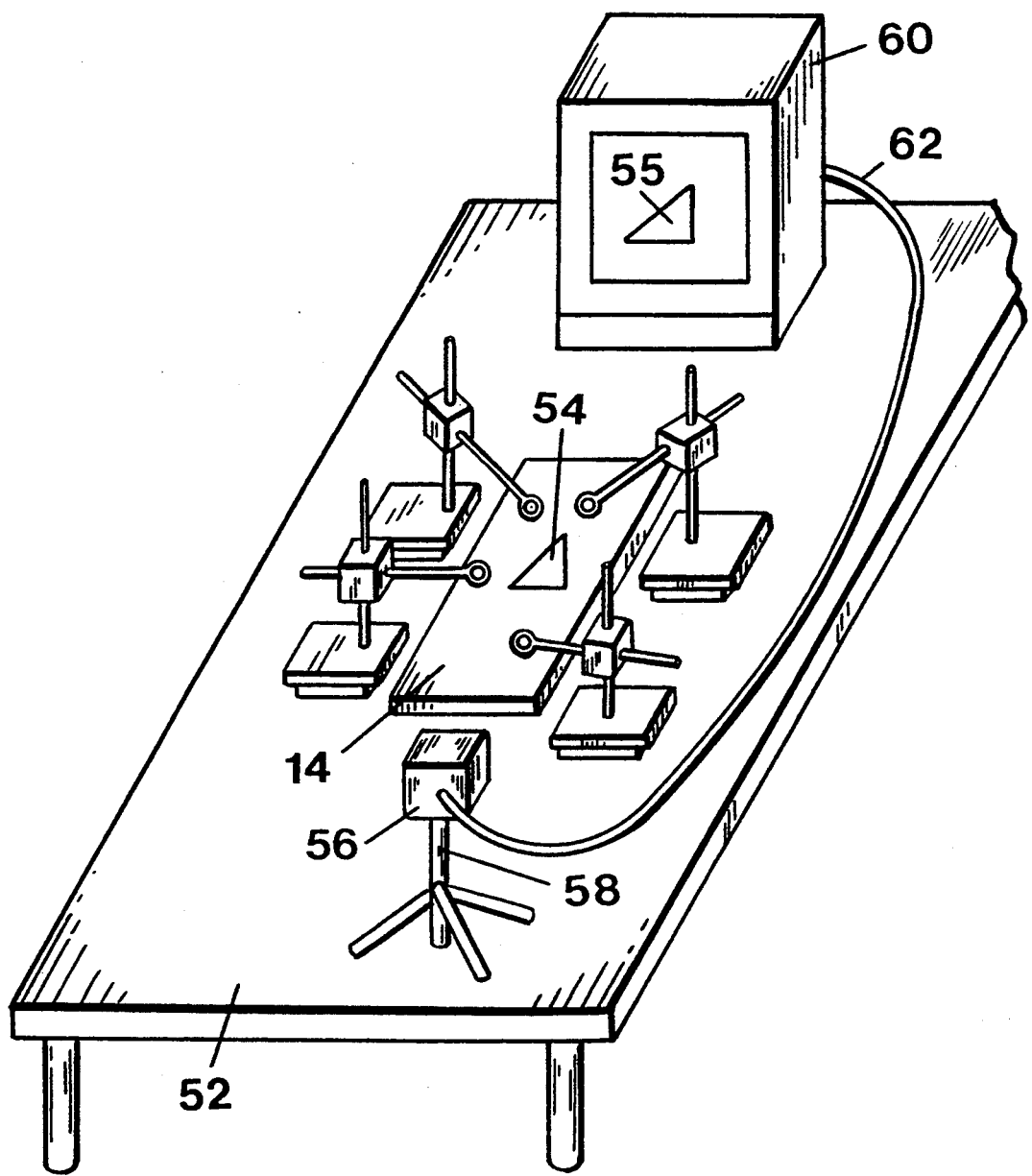
FIG. 8 depicts one embodiment of a complete simulated surgical procedure using the devices of the present invention.

A schematic example of a complete laparoscopic training set-up is depicted in FIG. 8. In FIG. 8 a surgical surface 14 is positioned upon a table 52. A specimen 54 upon which surgical techniques are to be conducted is placed upon the surgical surface 14. Surrounding the surgical surface 14 are a plurality of the aforementioned laparoscopic training devices 10 which have been configured to define apertures above the specimen 54 in a configuration that simulates the spacing and positioning of such apertures if surgically produced in an actual patient. A television camera 56 mounted upon a moveable base 58 such as a tripod and connected to a video monitor 60 by means of a cable 62 is oriented to photograph the specimen at an angle corresponding to the angle which would be seen during an actual laparoscopic surgical procedure if a video telescope were inserted into a patient through an appropriate surgical opening. However, since the present apparatus does not enclose the specimen, an image 55 can be provided to the video monitor 60 using a regular camera, thereby allowing the physician to simulate actual surgical conditions without the need to employ a surgical telescope. Visualization of the surgical specimen can be by direct line of vision or by indirect means using the video camera aimed at the surgical specimen and attached to a video monitor as in an actual laparoscopic procedure. Of course, it should be noted that the configuration depicted in FIG. 8 is merely one representation of the numerous uses and configurations of the subject laparoscopic training device. The invention is not intended to be limited solely to the use of multiple apertures and a video camera, but rather, may consist simply of a single aperture defining means as described previously.

Figure 9A:
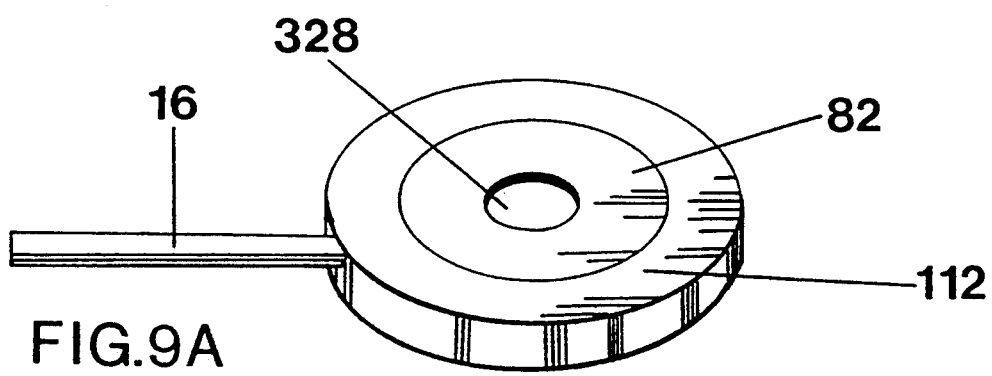
FIGS. 9A, 9B and 9C depict another embodiment of a moveable surface mounted to an aperture defining means via an annulus.
Figure 9B:
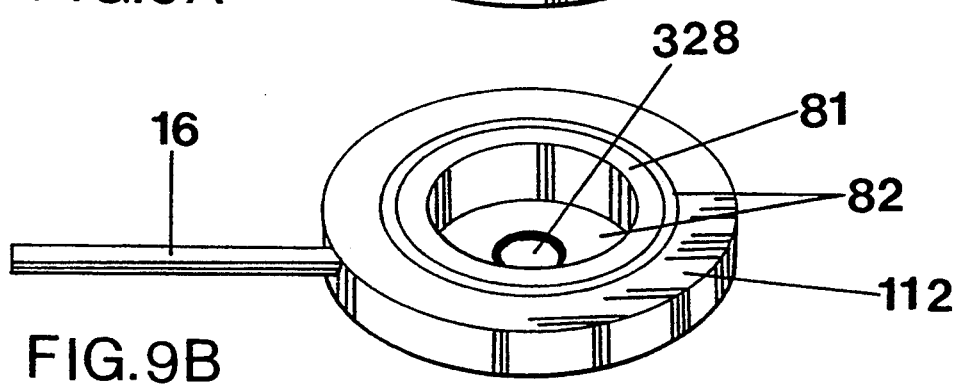

FIGS. 9A and 9B depict a top (9A) and bottom (9B) view of another embodiment for mounting a moveable surface means 82 between the aperture defining means 112 and an inner annulus means 81. The moveable surface means is made by using a flexible material that is either stretched or molded to fit tightly between the opposing surfaces of the aperture defining means and the inner annulus means. As before, the moveable surface includes a surgical aperture 328 for passage of laparoscopic instruments.

Figure 9C:
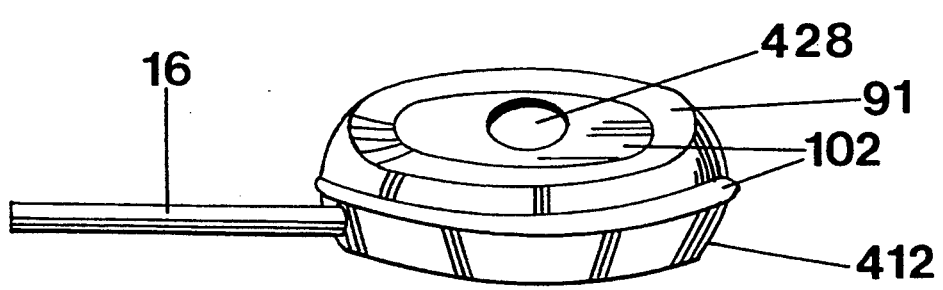

FIG. 9C depicts another embodiment for mounting a moveable surface means 102 by positioning it between the aperture defining means 412 and an overlying annulus means 91. A surgical aperture 428 is provided in the moveable surface. The unit thus produced may be adhered or secured by any means that produces stability, while still allowing flexibility of the moveable surface means. Examples of methods to adhere or secure the individual components include the use of welding or an adhesive, or in the alternative, a temporary contact may be achieved using a peg and hole system, velcro, magnets, or other like methods.

Figure 10A:
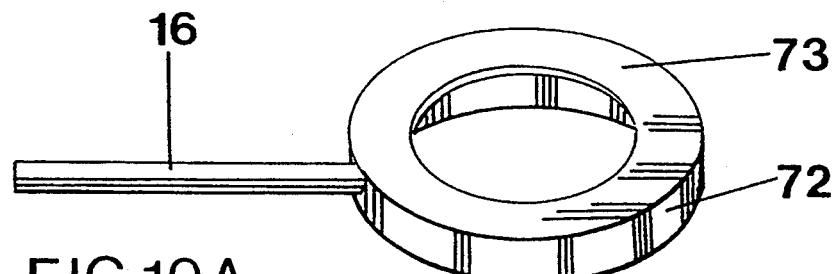
FIGS. 10A, 10B and 10C depict another embodiment where the aperture defining means is cup-shaped thereby allowing a moveable surface to be mounted on either a top or bottom horizontal surface.
Figure 10B:
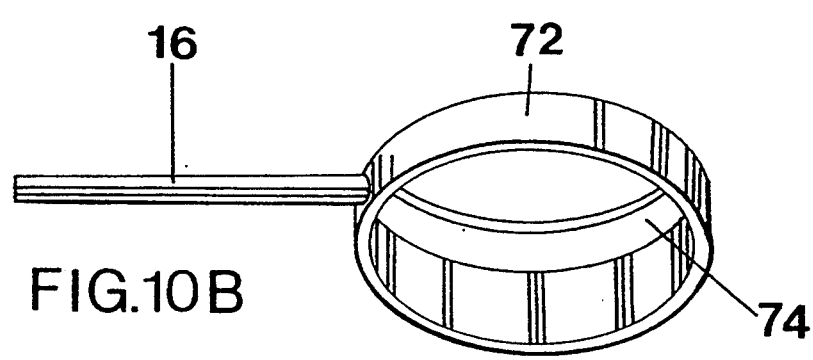
Figure 10C:
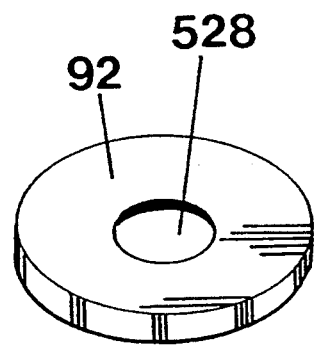

FIGS. 10A, 10B and 10C depict another embodiment for mounting a moveable surface means 92 containing a surgical aperture 528 on to a cup shaped aperture defining means 72. In this embodiment, the moveable surface means can be placed either on the top surface 73 or the bottom surface 74 of the cup shaped aperture defining means. The device can be secured as described above.

EQUIVALENTS

Although specific features of the invention are included in some embodiments and drawings and not others, it should be noted that each feature may be combined with any or all of the other features in accordance with the invention.

It should be understood, that the foregoing description of the invention is intended merely to be illustrative thereof, the illustrative embodiments are presented by way of example only, and that other modifications, embodiments, and equivalents may be apparent to those skilled in the art without departing from its spirit.

Having thus described the invention, what I desire to claim and secure by Letters Patent is:

1. A laparoscopic training device comprising:
   at least one aperture defining means;
   a means for allowing the aperture defining means to be positioned above a surgical specimen in a manner which simulates a surgical opening in a laparoscopic surgical procedure, the means for allowing the aperture defining means to be positioned including a means for repositioning the aperture defining means relative to the specimen; and
   a moveable surface defining a surgical aperture mounted within an aperture defined by the aperture defining means, wherein the moveable surface is mounted to the aperture defining means by means of an elongated thread or wire.

2. A laparoscopic training device as in claim 1 wherein the moveable surface comprises a substantially flat surface corresponding in shape generally to the aperture defined by the aperture defining means.

3. A laparoscopic training device as in claim 1 wherein the moveable surface comprises a disk having an aperture defining a surgical aperture therein.

4. A laparoscopic training method which comprises the steps of:
   a) providing a laparoscopic training device which comprises a substantially vertical support, an aperture defining means moveably mounted to the support, and a moveable surface mounted to the aperture defining means, the moveable surface defining a surgical aperture through which a laparoscopic instrument may be inserted,
   b) positioning the aperture defining means relative to a surgical specimen to simulate the positioning of a surgical opening in a laparoscopic procedure,
   c) inserting a laparoscopic surgical device through the surgical aperture, and
   d) manipulating the surgical specimen using the laparoscopic surgical device.

5. The method of claim 4 which further comprises the steps of providing a video camera to monitor the surgical specimen, the video camera being in operative communication with a video monitor and monitoring the manipulation of the surgical specimen by observing the surgical manipulation in the video monitor.

6. The method of claim 4 further comprising the use of a plurality of laparoscopic training devices, each having an aperture defining means positioned relative to the surgical specimen in a manner to define a plurality of simulated surgical openings therein.

* * * * *